United States Patent Office 2,758,126
Patented Aug. 7, 1956

2,758,126

METHOD FOR PREPARING HEXAALKOXYDISILOXANES

Alfred Goldschmidt and James R. Wright, El Cerrito, Calif., assignors to California Research Corporation, San Francisco, Calif., a corporation of Delaware No Drawing. Application December 30, 1953,
Serial No. 401,417

3 Claims. (Cl. 260—448.8)

This invention relates to the preparation of silicon esters, and it is particularly directed to the provision of a novel and inexpensive method for synthesizing hexaalkoxydisiloxanes.

The method heretofore commonly employed in preparing hexaalkoxydisiloxanes has been to first react silicon tetrachloride with the desired alcohol to produce the corresponding trialkoxychlorosilane and then to react the latter compound with water in the presence of an acid acceptor such as pyridine with the resultant formation of the disiloxane and of hydrogen chloride which reacts with the acid acceptor to form a salt. This method of preparation is relatively unattractive from a commercial standpoint since the acid acceptor material required is expensive and must be recovered from the reaction mixture in order to reduce the cost of the operation. This recovery step is not only expensive per se, but it also is disadvantageous since it reduces the yield of the desired disiloxane product due to the occlusion of said product by the acid acceptor salt which is normally separated from the reaction mixture in crystalline form. Further, organic bases such as pyridine and the like have unpleasant physical characteristics and their use presents a health hazard in some circumstances.

It has now been discovered that certain hexaalkoxydisiloxanes can readily be prepared in good yields and without the use of any acid acceptor by reacting the desired trialkoxysilamine with water. This reaction is illustrated by the following general equation:

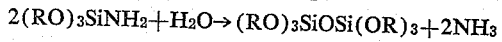

$$2(RO)_3SiNH_2 + H_2O \rightarrow (RO)_3SiOSi(OR)_3 + 2NH_3$$

where the R's, which may be the same as or different from one another represent straight or branched-chain primary alkyl radicals of from 1 to 12 carbon atoms, and preferably branched-chain primary alkyl groups of from 3 to 8 carbon atoms, each.

The trialkoxysilamine reactants employed in the present invention can be prepared by known methods. One convenient method is to react the corresponding trialkoxychlorosilane with ammonia as illustrated in Example I below. In this and other methods of preparation it is not necessary to separate the trialkoxysilamine compound from the other components of the reaction mixture in order to form disiloxanes by the present method, for good results can be obtained simply by adding water to the trialkoxysilamine-containing reaction mixture.

Representative trialkoxysilamine reactants, any one or more of which can be employed in a practice of the present invention, include: trimethoxysilamine, triethoxysilamine, tripropoxysilamine, triisopropoxysilamine, tributoxysilamine, triisobutoxysilamine, ethoxy-diisopropoxysilamine, tripentoxysilamine, trihexoxysilamine, tri-(2 - ethylhexoxy)silamine, tri(2,4 - dimethylpentoxy)silamine, tri-decoxysilamine and tri-dodecoxysilamine.

As indicated above, it is possible to use either a single trialkoxysilamine reactant or a combination of such reactants. In the latter case, the resulting reaction mixture will contain disiloxanes wherein both of the silicon atoms are attached to like alkoxy groups, as well as those wherein one trialkoxysilane group has been contributed by one reactant and the other thereof has been contributed by another of the trialkoxysilamine reactants.

The present reaction goes forward at room temperatures and preferably is conducted at temperatures below 100° F. until the reaction rate becomes relatively slow as indicated by a corresponding reduction in the rate of ammonia evolution. The reaction mixture is then preferably heated at a temperature between 100 and 200° F. so as to drive the reaction to completion. However, considerable reaction is obtained at temperatures below 100° F. in periods as short as one-half hour or even less. In the preferred practice of the invention the reaction mixture is maintained at a temperature below 100° F. for a period of from about 1 to 5 hours and is then heated for for a period of about ½ to 5 hours at a temperature between about 100 and 200° F.

The reaction proceeds in the absence of any catalyst. However, the use of a basic type of catalyst increases the reaction rate and improves the product yield. Accordingly, catalysts of this type are normally employed wherever possible. Suitable catalysts, which can be employed in the amount of from about 0.01 to 1.0 mole percent, based on the total number of moles of trialkoxysilamine reactant present, are sodium hydroxide, potassium hydroxide and the various alcoholates such as sodium methylate, sodium isopropylate, sodium ethylate, aluminum trimethylate and aluminum triisopropylate.

In carrying out the process of this invention, the proportion of water to the trialkoxysilamine reactant can be varied over a relatively wide range. Thus, while good results are obtained when equimolar proportions of water and the silamine reactant are used, the reaction is speeded up somewhat by the use of an excess of water over the amount theoretically required, the amount of this excess being in no wise critical. On the other hand, even when the amount of water employed is less than that theoretically required, a proportionate amount of the desired hexaalkoxydisiloxane product will be formed.

Inasmuch as the silamine reactants and the water employed in the present process are both liquids at the indicated reaction temperatures, it is not necessary to employ any inert solvent medium, though any suitable liquid of this character can be used if desired. Further, while it is not necessary so to do, improved results are obtained by bubbling nitrogen or other inert gas through the mixture as the reaction progresses in order to carry off the ammonia which is formed.

Once the reaction is substantially complete, as evidenced by a reduction or cessation in ammonia evolution, the reaction can be terminated and the disiloxane product recovered, preferably by fractional distillation under reduced pressures. Any unreacted silamine component can also be recovered in the same fashion. The disiloxanes prepared by a practice of this invention have particular utility as hydraulic fluids and as lubricants in systems which are subjected to extreme temperature conditions. In many cases it has been found that the liquid reaction mixtures obtained by the reaction of water and a silamine in accordance with the present invention make excellent hydraulic and lubricant fluids. Accordingly, in many cases it is not necessary to practice the step whereby the disiloxane product is separated from the other components of the reaction mixture.

The process of the present invention is illustrated by the following example.

Example I

This example relates to the preparation of hexa (2-ethylbutoxy)disiloxane by the reaction of water with tri- (2-ethylbutoxy) silamine. The latter reactant was prepared by charging 0.825 mole (233 grams) of tri(2-ethylbutoxy)chlorosilane and 350 cc. of n-hexane, as diluent, to a 2-liter flask equipped with stirrer, dropping funnel, thermometer and a reflux condenser. Ammonia was then passed through this mixture for a period of 4 hours, the temperature rising to about 130° F. during the early part of this reaction. The resulting reaction mixture, which contained approximately 0.82 mole of tri(2-ethylbutoxy)silamine, was cooled to room temperature and 400 cc. of water (containing 1 gram of sodium methylate catalyst) were added over a 20-minute period. Stirring was then continued for 2½ hours, in which period the contents of the flask remained substantially at room temperature, after which heat was applied and the temperature maintained at 125° F. for a period of 1½ hours. After cooling, the oil phase containing the desired disiloxane was separated and dried over sodium sulfate. The dried product was then fractionated under reduced pressure and the hexa (2-ethylbutoxy)disiloxane recovered in 60% yield as the fraction boiling at 220° C. at 1 mm.

The operation described in the foregoing paragraph was then repeated under identical conditions, but without the use of the sodium methylate or other catalyst. In this case the yield of hexa(2-ethylbutoxy)disiloxane was 20%.

We claim:
1. The method of preparing a disiloxane of the type having the general formula

$$(RO)_3SiOSi(OR)_3$$

which comprises reacting water with a trialkoxysilamine in the presence of an added basic catalyst selected from the group consisting of alkali metal hydroxides, alkali metal alcoholates and aluminum alcoholates, said trialkoxysilamine being of the type having the general formula $$(RO)_3SiNH_2$$

the R's in said general formulae representing radicals selected from the group consisting of straight chain and branched-chain primary alkyl radicals of from 1 to 12 carbon atoms each and the reaction being conducted at a temperature below 100° F. for a period of from about one to five hours and thereafter for a period of from about one-half to five hours at a temperature between 100 and 200° F.

2. The method of preparing a disiloxane of the type having the general formula $$(RO)_3SiOSi(OR)_3$$

which comprises reacting an excess of water with a silamine of the type having the general formula $$(RO)_3SiNH_2$$

in the presence of an added basic catalyst selected from the group consisting of alkali metal hydroxides, alkali metal alcoholates and aluminum alcoholates, the reaction being conducted at a temperature below 100° F. for a period of from about 1 to 5 hours and thereafter for a period of from about ½ to 5 hours at a temperature between 100 and 200° F., the R's in said general formulae representing radicals selected from the group consisting of straight chain and branched-chain primary alkyl radicals of from 3 to 8 carbon atoms each.

3. The method of preparing hexa(2-ethylbutoxy) disiloxane which comprises reacting tri(2-ethylbutoxy)silamine with an excess of water for a period of ½ to 5 hours at a temperature below 100° F. in the presence of a sodium methylate catalyst.

References Cited in the file of this patent

UNITED STATES PATENTS

| | | |
|---|---|---|
| 2,265,962 | Bent | Dec. 9, 1941 |
| 2,566,363 | Pedlow | Sept. 4, 1951 |

OTHER REFERENCES

Miner et al., "Ind. and Eng. Chem.," vol 39 (1947), pages 1368–1371.